(12) United States Patent
Schembri

(10) Patent No.: US 8,012,765 B2
(45) Date of Patent: *Sep. 6, 2011

(54) METHOD FOR MIXING A FILM OF FLUID

(75) Inventor: Carol T. Schembri, San Mateo, CA (US)

(73) Assignee: Agilent Technologies, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/753,777

(22) Filed: Apr. 2, 2010

(65) Prior Publication Data

US 2010/0248982 A1    Sep. 30, 2010

Related U.S. Application Data

(63) Continuation of application No. 12/115,316, filed on May 5, 2008, now abandoned, which is a continuation of application No. 10/358,783, filed on Feb. 4, 2003, now Pat. No. 7,371,349, which is a continuation of application No. 09/782,542, filed on Feb. 12, 2001, now Pat. No. 6,513,968, which is a continuation of application No. 09/137,963, filed on Aug. 21, 1998, now Pat. No. 6,186,659.

(51) Int. Cl.
    *G01N 1/38* (2006.01)
(52) U.S. Cl. ..................................... 436/174; 435/286.7
(58) Field of Classification Search .................. None
    See application file for complete search history.

(56) References Cited

U.S. PATENT DOCUMENTS

| | | |
|---|---|---|
| 1,750,245 A | 3/1930 | Schwedier |
| 4,007,010 A | 2/1977 | Woodbridge, III |
| 4,504,547 A | 3/1985 | Horodniceanu et al. |
| 4,723,129 A | 2/1988 | Endo et al. |
| 4,792,283 A | 12/1988 | Okayasu |
| 4,849,340 A | 7/1989 | Oberhardt |
| 5,221,326 A | 6/1993 | Yamaguchi et al. |
| 5,222,808 A | 6/1993 | Sugarman et al. |
| 5,275,787 A | 1/1994 | Yuguchi et al. |
| 5,322,799 A | 6/1994 | Miller et al. |
| 5,438,959 A | 8/1995 | Stone et al. |
| 5,443,985 A | 8/1995 | Yu et al. |
| 5,578,832 A | 11/1996 | Trulson et al. |
| 5,605,653 A | 2/1997 | DeVos et al. |
| 5,630,924 A | 5/1997 | Fuchs et al. |

(Continued)

FOREIGN PATENT DOCUMENTS

DE      19728520      1/1999

(Continued)

OTHER PUBLICATIONS

Hein et al, "Bubble Motion Induced by Marangoni Covection Under the Influence of Gravity", Chem. Eng, Technol., vol. 21, 1998, pp. 41-44.

(Continued)

*Primary Examiner* — Yelena G Gakh
(74) *Attorney, Agent, or Firm* — James S. Keddie; Bret E. Field; Bozicevic, Field & Francis

(57) ABSTRACT

A method and apparatus is provided for mixing a film of fluid, particularly a film of chemical, biochemical, or biological fluids undergoing a reaction. The apparatus comprises a means for nucleating a bubble using a discrete heat source, such as a resistor, and moving the bubble in the fluid by creating a temperature gradient, thereby mixing the fluid.

16 Claims, 2 Drawing Sheets

U.S. PATENT DOCUMENTS

| | | | |
|---|---|---|---|
| 5,699,462 | A | 12/1997 | Fouguet et al. |
| 5,834,758 | A | 11/1998 | Trulson et al. |
| 5,856,174 | A | 1/1999 | Lipshutz et al. |
| 5,910,288 | A | 6/1999 | Schembri |
| 5,922,591 | A | 7/1999 | Anderson et al. |
| 5,945,334 | A | 8/1999 | Besemer et al. |
| 5,947,784 | A | 9/1999 | Cullen |
| 6,062,681 | A | 5/2000 | Field et al. |
| 6,065,864 | A | 5/2000 | Evans et al. |
| 6,071,081 | A | 6/2000 | Shiraishi |
| 6,114,122 | A | 9/2000 | Besemer et al. |
| 6,186,659 | B1 | 2/2001 | Schembri |
| 6,287,850 | B1 | 9/2001 | Besemer et al. |
| 6,391,623 | B1 | 5/2002 | Besemer et al. |
| 6,399,365 | B2 | 6/2002 | Besemer et al. |
| 6,420,114 | B1 | 7/2002 | Bedilion et al. |
| 6,513,968 | B2 | 2/2003 | Schembri |
| 6,551,817 | B2 | 4/2003 | Besemer et al. |
| 6,733,977 | B2 | 5/2004 | Besemer et al. |
| 7,371,349 | B2 | 5/2008 | Schembri |
| 2004/0072363 | A1 | 4/2004 | Schembri |

FOREIGN PATENT DOCUMENTS

| | | |
|---|---|---|
| EP | 9332126 | 8/1999 |
| EP | 695941 | 7/2002 |
| GB | 1246566 | 9/1971 |
| WO | WO 95/33846 | 12/1995 |
| WO | 01/43871 | 6/2001 |

OTHER PUBLICATIONS

Klibanov et al. "Targeting of ultrasound contrasst material. An In vitro feasibility study", Acat radiologica, 1997, vol. 38, Supplement 412, pp. 113-120.

ns. Genetic 50
METHOD FOR MIXING A FILM OF FLUID

CROSS-REFERENCE TO RELATED APPLICATIONS

This application is a continuation of U.S. patent application Ser. No. 12/115,316, which is a continuation of U.S. patent application Ser. No. 10/358,783 (U.S. Pat. No. 7,371,349), which is a continuation of U.S. patent application Ser. No. 09/782,542 (U.S. Pat. No. 6,513,968), which is a continuation of U.S. patent application Ser. No. 09/137,963 (U.S. Pat. No. 6,186,659). Priority is claimed from the foregoing applications under 35 U.S.C. 120 and those applications are incorporated herein by reference.

TECHNICAL FIELD

This invention relates to mixing fluids, and more particularly relates to an apparatus and method for mixing a small quantity of fluid that is present as a film on a solid substrate.

BACKGROUND

Methods for mixing relatively large volumes of fluids usually utilize conventional mixing devices that mix the fluids by shaking the container, by a rapid mechanical up and down motion, or by the use of a rocking motion that tilts the container filled with the fluids in a back and forth motion. The conventional mixing methods normally cannot be utilized for methods involving thin films of fluid because the capillary strength of the containment system often significantly exceeds the forces generated by shaking or rocking, thereby preventing or minimizing fluid motion in the film. The problem is illustrated by a surface chemistry reaction where the surface is large and the available fluid sample is very small. The fluid when spread across the surface results in a thin film of fluid that may have a thickness of a few microns to a few millimeters. In such situations, the fluid may not adequately contact the entire reactive surface or the reactive compounds in the fluid may be very dilute thereby resulting in a reaction that is limited by the rate of diffusion through the fluid. Thus, inadequate mixing can adversely affect the sensitivity or specificity of the reaction, the rate of reaction, the extent of reaction, the homogeneity, or the percent yield.

Inadequate mixing is a particular problem in chemical and biological assays where very small samples of chemical, biochemical, or biological fluids are typically reacted. For example, the ability to clone and synthesize nucleotide sequences has led to the development of a number of techniques for disease diagnosis and genetic analysis. Genetic analysis, including correlation of genotypes and phenotypes, contributes to the information necessary to reveal the changes in genes which confer disease. New methods of diagnosis of diseases, such as AIDS, cancer, sickle cell anemia, cystic fibrosis, diabetes, muscular dystrophy, and the like, rely on the detection of mutations present in certain nucleotide sequences. Many of these techniques generally involve hybridization between a target nucleotide sequence and a complementary probe, offering a convenient and reliable means for the isolation, identification, and analysis of nucleotides.

One typical method involves hybridization with either target or probe nucleotide sequences immobilized on a solid support. The targets or probes are usually immobilized on a solid support having a surface area of typically less than a few square centimeters. The solid support is typically a glass or fused silica slide which has been treated to facilitate attachment of either the targets or probes. The mobile phase containing reactants that react with the attached targets or probes is placed on the support, covered with another slide, and placed in an environmentally controlled chamber such as an incubator. Normally, the reactants in the mobile phase diffuse through the liquid to the interface where the complementary probes or targets are immobilized, and a reaction, such as hybridization reaction, then occurs. Preferably, the mobile phase reactants are labeled with a detectable tag, such as a fluorescent tag, so that the hybrid could be identified. The hybridization reaction typically takes place over a time period that can be many hours.

Problems are often encountered in conducting chemical or biological assays, including use of arrays, with poor hybridization kinetics and efficiency or reaction specificity and sensitivity, since diffusion is the only means of moving the reactants in the mobile phase to the interface or surface containing the immobilized reactants. Alternatively, the fluid sample must be removed from the reaction chamber, mixed in separate chambers external to the reaction chamber, and then reintroduced into the reaction chamber. Valuable fluid sample is wasted or lost in the separate external chambers required in such mixing process.

A method and apparatus for mixing a thin film of fluid, particularly a chemical, biochemical, or biological fluid undergoing a reaction, is described in a copending application U.S. Ser. No. 08/889,763. The application describes a thin film of fluid between two opposing surfaces that is mixed by moving one surface relative to the other.

The present invention describes an apparatus and method for mixing of a film of fluid via nucleation of bubbles within the film. The use of bubbles for mixing large volumes of liquids is well known. For example, U.S. Pat. No. 5,443,985 to Lu et al. and U.S. Pat. No. 5,605,653 to DeVos describe the mixing and aeration of large volumes of liquid, such as a culture medium in a cell culture bioreactor by introducing extraneous gas at the bottom of the reactor thereby creating bubbles that travel upwards, thus mixing the liquid medium. In another context, U.S. Pat. No. 5,275,787 to Yaguchi et al. describes the use of thermal energy to generate a bubble that is then used to discharge a sample liquid containing individual particles. The generation of the bubble and its use as an optical switching element for devices that have uses in telecommunication systems and data communication systems is described in U.S. Pat. No. 5,699,462 to Fouquet et al. and U.S. Pat. No. 4,988,157 to Jackel et al.

SUMMARY OF THE INVENTION

The invention, in one embodiment, is an apparatus for mixing a film of fluid, particularly a chemical, biochemical, or biological fluid which typically comprises a reaction mixture, the apparatus comprising a first substrate having an inner surface and a substantially parallel second substrate having an inner surface that defines a closed chamber therebetween. The closed chamber is adapted to retain a quantity of fluid so that the fluid is in contact with both inner surfaces. In addition, the apparatus comprises a means for nucleating bubbles in the fluid comprising discrete heat sources for creating individual bubbles at selected locations within the apparatus such that as each bubble is nucleated and dispelled, the fluid is displaced resulting in mixing, and a means for moving the bubbles in the fluid. The inner surface of one or both of the substrates is functionalized with reactive moieties that can react with the components contained in the fluid. The bubbles are nucleated by using discrete heat sources, such as resistors arranged in a predetermined pattern adjacent to the inner surface of the substrate.

In another embodiment, only the first substrate has the means for nucleating bubbles comprising discrete heat sources adjacent to the inner surface and is functionalized with reactive moieties.

The invention also provides a method for mixing a film of fluid comprising providing a first substrate and a substantially parallel second substrate having inner surfaces that define a closed chamber therebetween. The chamber is adapted to retain a quantity of fluid so that the fluid is in contact with both inner surfaces. The method further comprises introducing a fluid containing a plurality of components into the closed chamber so as to provide a film of fluid therein, nucleating a bubble within the fluid film, whereby, as each bubble that is nucleated is dispelled, the fluid is displaced resulting in mixing, and a means for moving a bubble in the film of fluid. The bubbles may be moved in the film of fluid by creating a temperature gradient along which the bubbles move.

BRIEF DESCRIPTION OF THE DRAWINGS

FIG. 1 is a schematic diagram of an apparatus of the present invention wherein the first substrate 10 is substantially parallel to the second substrate 11 with a seal 15 in between.

FIG. 3 is a edge on view of an apparatus of the present invention, wherein the first substrate 10 and the second substrate 11 are substantially parallel with a seal 15 in between.

DETAILED DESCRIPTION OF THE INVENTION

Figure 1:
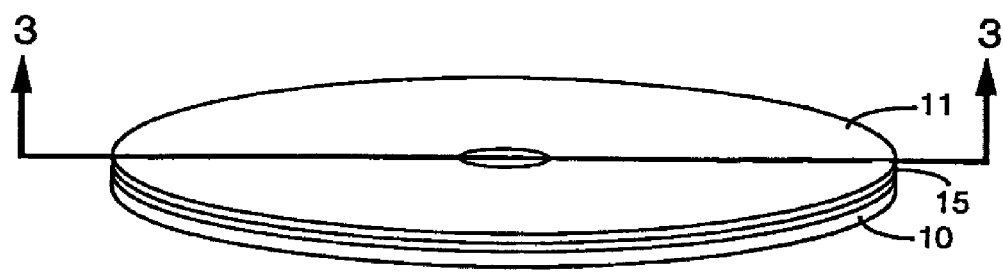

Overview and Definitions:

Before describing the present invention in detail, it is to be understood that this invention is not limited to specific compositions, reagents, process steps, or equipment, as such may vary. It is also to be understood that the terminology used herein is for the purpose of describing particular embodiments only, and is not intended to be limiting.

It must be noted that, as used in this specification and the appended claims, the singular forms "a," "an," and "the" include plural referents unless the context clearly dictates otherwise.

In describing and claiming the present invention, the following terminology will be used in accordance with the definitions set out below.

The term "bubble" as used herein refers to a small ball of gas in a fluid wherein the gas originates from fluid vapor (a vapor bubble) or dissolved gas (a gas bubble) in the fluid. The word "bubble" used alone encompasses both a gas bubble and a vapor bubble.

The term "fluid" as used herein refers to a material that can flow such as a liquid, or a semisolid.

The term "functionalization" as used herein relates to modification of a solid substrate to provide a plurality of functional groups on the substrate surface. By a "functionalized surface" as used herein is meant a substrate surface that has been modified so that a plurality of functional groups are present thereon.

The term "monomer" as used herein refers to a chemical entity that can be covalently linked to one or more other such entities to form an oligomer. Examples of "monomers" include nucleotides, amino acids, saccharides, peptides, and the like. In general, the monomers used in conjunction with the present invention have first and second sites (e.g., C-termini and N-termini, or 5' and 3' sites) suitable for binding to other like monomers by means of standard chemical reactions (e.g., condensation, nucleophilic displacement of a leaving group, or the like), and a diverse element which distinguishes a particular monomer from a different monomer of the same type (e.g., an amino acid side chain, a nucleotide base, etc.). The initial substrate-bound monomer is generally used as a building-block in a multi-step synthesis procedure to form a complete ligand, such as in the synthesis of oligonucleotides, oligopeptides, and the like.

The term "oligomer" is used herein to indicate a chemical entity that contains a plurality of monomers. As used herein, the terms "oligomer" and "polymer" are used interchangeably, as it is generally, although not necessarily, smaller "polymers" that are prepared using the functionalized substrates of the invention, particularly in conjunction with combinatorial chemistry techniques. Examples of oligomers and polymers include polydeoxyribonucleotides, polyribonucleotides, other polynucleotides which are -or C-glycosides of a purine or pyrimidine base, polypeptides, polysaccharides, and other chemical entities that contain repeating units of like chemical structure. In the practice of the instant invention, oligomers will generally comprise about 2-50 monomers, preferably about 15-30 monomers.

The term "ligand" as used herein refers to a moiety that is capable of covalently or otherwise chemically binding a compound of interest. Typically, when the present substrates are used in solid phase synthesis, they are used so that "ligands" are synthesized thereon. These solid-supported ligands can then be used in screening or separation processes, or the like, to bind a component of interest in a sample. The term "ligand" in the context of the invention may or may not be an "oligomer" as defined above. However, the term "ligand" as used herein may also refer to a compound that is not synthesized on the novel functionalized substrate, but that is "pre-synthesized" or obtained commercially, and then attached to the substrate.

The term "sample" as used herein relates to a material or mixture of materials, typically, although not necessarily, in fluid form, containing one or more components of interest.

The terms "nucleoside" and "nucleotide" are intended to include those moieties which contain not only the known purine and pyrimidine bases, but also other heterocyclic bases that have been modified. Such modifications include methylated purines or pyrimidines, acylated purines or pyrimidines, or other heterocycles. In addition, the terms "nucleoside" and "nucleotide" include those moieties that contain not only conventional ribose and deoxyribose sugars, but other sugars as well. Modified nucleosides or nucleotides also include modifications on the sugar moiety, e.g., wherein one or more of the hydroxyl groups are replaced with halogen atoms or aliphatic groups, or are functionalized as ethers, amines, or the like. As used herein, the term "amino acid" is intended to include not only the L-, D- and nonchiral forms of naturally occurring amino acids (alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine), but also modified amino acids, amino acid analogs, and other chemical compounds which can be incorporated in conventional oligopeptide synthesis, e.g., 4-nitrophenylalanine, isoglutamic acid, isoglutamine, ε-nicotinoyl-lysine, isonipecotic acid, tetrahydroisoquinoleic acid, α-aminoisobutyric acid, sarcosine, citrulline, cysteic acid, t-butylglycine, t-butylalanine, phenylglycine, cyclohexylalanine, β-alanine, 4-aminobutyric acid, and the like.

Figure 2:
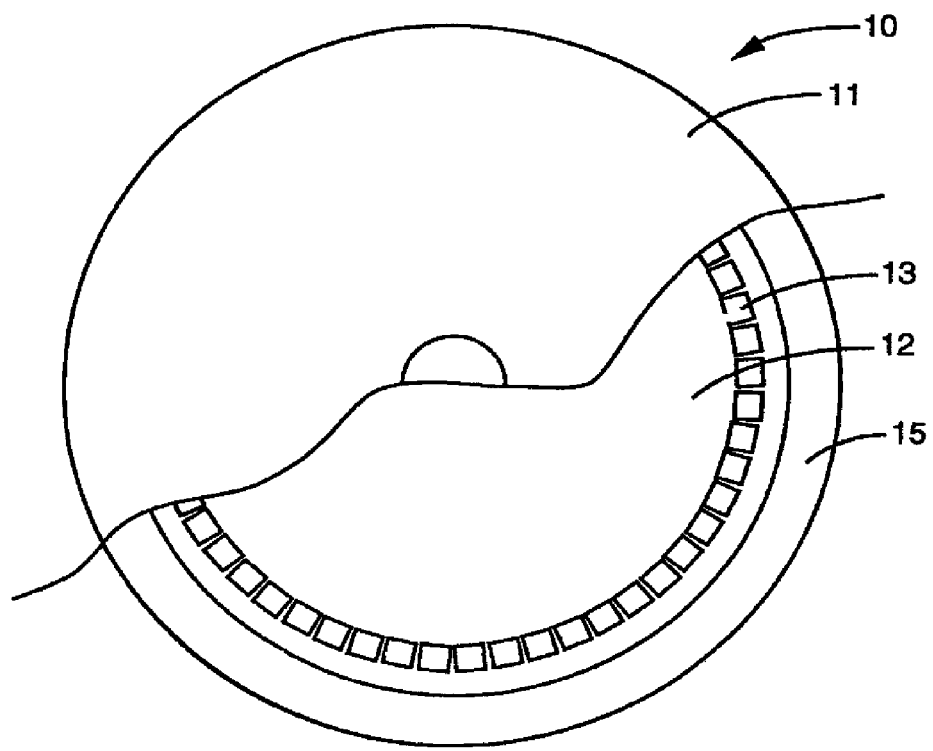
FIG. 2 is a cross-sectional view of the apparatus shown in FIG. 1, wherein discrete resistors 13 are adjacent to the inner surface 12 of the first substrate 10 with a seal 15 in between the first 10 and the second 11 substrates.

Accordingly, the invention in a first embodiment is directed to an apparatus, shown in FIGS. 1 and 2, comprising a first substrate 10 having an inner surface 12 that can retain a film of fluid and a means of nucleating bubbles in the film of fluid. The substrate may be composed of any material that is compatible with the fluids with which the surface comes in contact with, such as, for example, glass, silicon, fused silica, metal, ceramic, plastic, or other polymers such as nylon. The substrate may be rigid or flexible, and may define a shape that is substantially planar in the shape of a circle, an ellipse, a square, a rectangle, a triangle, or any other convenient substantially planar shape. The surface area of the inner surface that comes in contact with the fluid is on the order of about 10 $mm^2$ to about 20 $cm^2$, more preferably from about 100 $mm^2$ to about 10 $cm^2$, and most preferably about 200 $mm^2$ to about 10 $cm^2$. The volume of the fluid that can be retained by the inner surface is less than about 300 µl, more preferably less than about 150 µl, even more preferably less than about 50 µl.

The inner surface of the substrate has means for nucleating bubbles in the film of fluid, comprising discrete heat sources, radiofrequency sources, microwave sources, light sources, or mechanical sources. In the preferred embodiment, the means for nucleating bubbles comprise discrete heat sources, preferably resistors 13. The resistors are adjacent to the inner surface of the substrate and in thermal communication with the film of fluid retained thereon. The resistors are electrically connected to a control circuit that controls the voltages or currents applied to the resistors to nucleate the bubble. Bubbles are thus nucleated by heating the fluid in the local environment around the resistors. Subsequently, the control circuit may selectively reduce the electrical input to the resistors to allow the bubble to dissipate or collapse.

The apparatus for mixing a film of fluids also has means for moving a bubble through the fluid. In the preferred embodiment, as a heat source is turned off, a neighboring heat source may be turned on, thereby creating a temperature gradient in the fluid. The bubble will move along the temperature gradient from the region of lower temperature towards the region of higher temperature. The movement of the bubble along the temperature gradient, caused by thermocapillary action, displaces the local fluid thereby mixing it. Thus, the control circuit can control the temperature gradient. In addition, the control circuit can control the ambient temperature of the film of fluid by supplying an identical amount of voltage or current to nearly all the resistors at the same time.

The fluid can be mixed locally by moving a bubble back and forth between two neighboring heat sources. Alternatively, a plurality of bubbles can be nucleated at a plurality of locations and moved independently of one another. In addition, a pre-fabricated pattern of heat sources can be created such that the bubble is moved from one heat source to the next along the temperature gradient dictated by the pattern. The pattern of the heat sources can be linear, circular, rectangular, or any other convenient pattern. Moving the bubble along a circular pattern, for example, induces a stirring motion in the film of fluid. Similarly, if the temperature gradient is linear, the bubble will move back and forth along the line thereby inducing a back and forth motion in the fluid.

The inner surface of the substrate is functionalized with reactive moieties to provide a plurality of functional groups on the substrate surface, typically hydroxyl, carboxylic, amido, or amino groups, that are preferably bound to a ligand. The reactive moieties can be covalently bound or otherwise chemically bound to the ligand through a variety of methods known in the art. Optimally, the density of the chemical, biochemical, or biological ligands is greater than about 100 per square micron, more preferably greater than about 1,000 per square micron, an even more preferably greater than about 5,000 per square micron. The ligands are selected from a monomeric species having at least one reactive site, DNA, RNA, proteins, peptides, prions, reagents, and combinations, derivatives, and modifications thereof. See for example, Kreiner (1996) ARapid Genetic Sequence Analysis Using a DNA Probe Array System, @*American Laboratory* March: 39-43; Lipshutz et al. (1995) AUsing Oligonucleotide Probe Arrays to Access Genetic Diversity, @*BioTechniques* 19: 442-447; Fodor et al. (1991) ALight-directed, Spatially Addressable Parallel Chemical Synthesis, @*Science* 252: 767-772; Medlin (1995) AThe Amazing Shrinking Laboratory, @*Environmental Health Perspectives* 103: 244-246; Southern et al. (1992) AAnalyzing and comparing Nucleic Acid Sequences by Hybridization to Arrays of Oligonucleotides: Evaluation Using Experimental Models, @*Genomics* 13: 1008-1017; and Gacia et al. (1996) ADetection of Heterozygous Mutations in BRCA1 using High Density Oligonucleotide Arrays and Two-color Fluorescence Analysis, @*Nature Genetics* 14: 441-447; and U.S. Pat. Nos. 5,585,639; 5,601,980; and 5,551,487.

Optionally, a seal 15 can be attached to the outer periphery of the substrate, thus creating a chamber for the fluid with a defined thickness. The fluid is applied to an application site near the center of the apparatus, and then distributed across the first surface to give the film of fluid. Prior to the initiation of the mixing process, the fluid can be distributed across the inner surfaces of the substrate by, for example, rotating the apparatus, or by spreading with a cover slip. In addition, a second substrate 11, or a simple glass cover slip is placed on top of the seal where the substantially parallel substrates define a closed chamber 16. The closed chamber may be a micron to several millimeters in thickness, preferably from about 5 microns to about 100 microns in thickness.

Alternatively, two or more different fluids, each containing a reactive moiety, can be introduced into the closed chamber and mixed to substantial homogeneity. This is advantageous when it is inconvenient or not possible to attach the ligands to the reactive moiety on the inner surface of the solid substrate.

In addition, a dye, label, tag, reagent, or derivatives, modifications, or combinations thereof may be dried, lyophilized, or otherwise attached to the inner surface of the substrate. The chemical, biochemical, or biological fluid is introduced into the closed chamber, and the mixing process initiated to allow the desired reaction or labeling to occur. The reaction can be monitored after the mixing process is completed or interspersed with the mixing process if necessary or desired. This process is particularly advantageous for fluids or reactions which are optically dense and, therefore, must be analyzed in a very thin section or film by a spectrophotometer or other analytical means. The process is also an advantage for specimens such as cellular suspensions or thin biopsies which will be visually inspected in thin sections or films for accurate count, diagnosis, or other analysis. This process is also an advantage when the sample is particularly valuable or only available in minute quantities.

Electrical connection (not shown) is made to the resistors adjacent the inner surface of the substrate, and a bubble is nucleated at one or more resistors. Turning off a resistor removes the heat and collapses the nucleated bubble, thereby displacing the liquid resulting in mixing. Preferably, as one resistor is turned off, if a neighboring resistor is activated, a temperature gradient is created and the nucleated bubble moves towards the hotter area resulting in a mixing action. The mixing action is continued for the required period of time.

Figure 3:
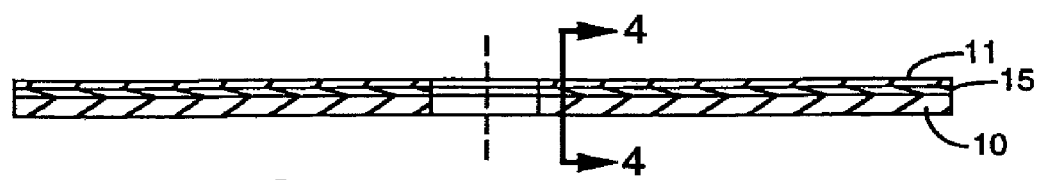

The apparatus having closed edges, shown in FIG. 3, may additionally include a seal 15 between the two opposing inner surfaces. The seal can be solid or flexible, and is fabricated from, for example, adhesives, rubber, plastic, glass, or metal. The apparatus preferably includes an opening in one of the substrates or in the seal for introducing fluid into the closed chamber. The opening may be a port or other entrance. The fluid may be introduced by centrifugal means, pressure means, vacuum means, positive displacement means, or other means known in the art.

Figure 4:
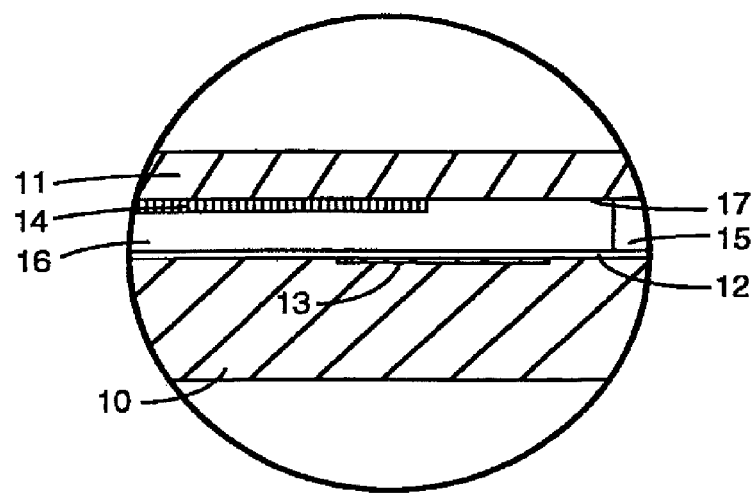
FIG. 4 is a cross-sectional view of the apparatus shown in FIG. 3, illustrating the plurality of chemical, biochemical, or biological moieties 14 attached to the inner surface 12 of the second substrate 11 and discrete resistors 13 adjacent to the inner surface of the first substrate 10.

The inner surface of first solid substrate 10 can have both the means for nucleating bubbles in the film of fluid and be functionalized with reactive moieties. Alternatively, as shown in FIG. 4, the inner surface of one of the substrates can have the means for nucleating bubbles 13 in the film of fluid and the inner surface of the other substrate can be functionalized with reactive moieties 14, wherein the fluid is retained in the closed chamber 16. Finally, the inner surfaces of both substrates can have means for nucleating bubbles in the film of fluid and both can be functionalized with reactive moieties that are bound to ligands which are identical or preferably different.

The apparatus can be adapted for automated use, such as through the use of various controllers, computers, and the like. In addition, the apparatus can be adapted for use with multiple fluid chambers simultaneously, where the temperature controlled environment is capable of containing and mixing multiple fluid chambers.

EXAMPLES

Example 1

Hybridization to DNA Arrays

An array of DNA probes is constructed by attaching a plurality of known probes comprising oligomers, PCR product, or cDNA at specific locations on the inner surface of the substrate using techniques well known in the art. The substrate is a circular glass slide having a surface area of about 100 $mm^2$, and having resistors on the inner surface that are connected to a electrical source. A rubber seal is placed around the outer edge of the substrate. About 50 µl of reactive fluid, comprising a sample of mRNA, is placed on the inner surface of the solid substrate. A glass slide is placed parallel to the first substrate and on top of the seal. The substrate is then rotated by a rotating mechanism, such as a motor, at an appropriate rotational speed in order to distribute the reactive fluid across the first surface of the substrate. The rotational speed may, for example, be in the range of a few hundred rpm to several thousand rpm. Once the fluid is distributed over the surface of the substrate, the fluid may be heated to an optimum temperature for the reaction. For example, the fluid may be heated to 65 1 C for hybridization studies where the surface probes are cDNA, or the fluid may be heated to 37 1 C where the surface probes are oligomers.

For mixing the fluid, voltage or current is applied to at least one of the resistors that nucleates a bubble in the fluid. Then, voltage or current is turned off while voltage or current to the neighboring resistor is turned on. This creates a temperature gradient and the bubble is lured towards the hotter zone. The bubble is thus moved in a circular pattern, inducing a stirring motion in the film of fluid. After hybridization is complete, the sample is removed from the apparatus, the inner surface of the substrate is washed, and the apparatus is then analyzed to determine the quantity of mRNA that has hybridized to each location. The entire process can be automated by use of computer control.

Example 2

Hybridization to RNA Arrays

An array of mRNA probes in a rectangular pattern is constructed at specific locations on the inner surface of the solid substrate using techniques well known in the art. The substrate is a rectangular glass slide having a surface area of about 100 $mm^2$. A second substrate of silicon has heating sources that are resistors adjacent to the inner surface that are connected to a electrical source. The resistors are arranged in a square pattern. The two inner surfaces are held in parallel to each other in an opposing relationship, and then a glass seal is applied between the two substrates. Into the closed chamber thus created, about 50 µl of reactive fluid, comprising a sample of DNA, is placed by positive pressure. The fluid is then heated to 45 1 C by applying a constant predetermined voltage to all the electrodes.

As in Example 1, additional voltage or current is applied to at least one of the resistors that nucleates a bubble in the fluid. Then, voltage or current is returned to the base level while voltage or current to the neighboring resistor is increased. This creates a temperature gradient and the bubble is moved in a square pattern, inducing a stirring motion in the film of fluid. After hybridization is complete, the sample is removed from the apparatus, the inner surface of the substrate is washed, and the apparatus is then analyzed to determine the quantity of DNA hybridized at each location.

Example 3

Solid Phase Synthesis of Polystyrene

Styrene is covalently bound via the aromatic ring to specific locations on the inner surface of the first substrate using techniques well known in the art, such that the ethylene moiety remains reactive. The first substrate is a circular silicon slide having a surface area of about 10 $cm^2$, and having a plurality of resistors on the inner surface that are connected to a electrical source The resistors are arranged in circular pattern. About 250 µl of reactive fluid, comprising a sample of styrene and 2,2'-azo-bis-isobutyronitrile as the free radical initiator, is placed on the inner surface of the first solid substrate. The inner surface of a second substrate is held parallel to the inner surface of the first substrate, and a glass seal is then applied between the two substrates. The apparatus is rotated by a rotating mechanism, as in Example 1, to evenly distribute the fluid. The fluid is then heated to 30 1 C as in Example 2.

Additional voltage or current is applied to at least one of the resistors that nucleates a bubble in the fluid. Then, voltage or current is returned to the base level while voltage or current to the neighboring resistor is applied. This creates a temperature gradient and the bubble is moved in a back and forth pattern across the length of the solid substrate. After reaction is complete, the sample is removed from the apparatus, the inner surface of the first substrate is washed, and a fresh sample of fluid containing monomer suitable for polymerization is added. The steps above are repeated until the desired length of the polymer is obtained. The polymer chain is then dissociated from the first substrate to give free polystyrene.

It is to be understood that while the invention has been described in conjunction with preferred specific embodiments thereof, the foregoing description, as well as the examples which follow, are intended to illustrate and not limit the scope of the invention. Other aspects, advantages and modifications within the scope of the invention will be apparent to those skilled in the art to which the invention pertains.

The invention claimed is:

1. A method for mixing a film of fluid, comprising:
providing a first substrate and a second substrate having inner surfaces and a seal that define a closed chamber up to several millimeters in thickness therebetween, said closed chamber adapted to retain a quantity of fluid so that the fluid is in contact with both inner surfaces, and wherein at least one of said inner surfaces is functionalized with polynucleotides, polypeptides, or polysaccharides;
introducing a fluid containing a plurality of components so as to provide a quantity of fluid in contact with both inner surfaces;
providing a bubble in the fluid using a discrete, controllable heat source; and
moving the provided bubble within the fluid in the closed chamber to result in mixing.

2. A method according to claim 1, wherein the polynucleotide is a polyribonucleotide.

3. A method according to claim 2, wherein the chamber is adapted to retain a film of fluid in contact with both inner surfaces.

4. A method according to claim 1, wherein the inner surfaces of the first and second substrates are substantially parallel.

5. A method according to claim 1, wherein the chamber is up to three millimeters in thickness.

6. A method according to claim 1, wherein the chamber is up to two millimeters in thickness.

7. A method according to claim 1, wherein the bubble is moved within the closed chamber using a plurality of discrete heat sources that create a temperature gradient in said fluid.

8. A method according to claim 7, wherein said discrete sources are resistors.

9. A method of claim 7, wherein the heat sources are positioned adjacent an inner surface of at least one of the first and second surfaces.

10. A method of claim 9, wherein the heat sources comprises resistors arranged in a predetermined pattern.

11. The method of claim 1, wherein the at least one of said inner surfaces is functionalized with polynucleotides.

12. The method of 1, wherein the at least one of said inner surfaces is functionalized with polypeptides.

13. A method for mixing a film of fluid comprising:
providing a first substrate and a second substrate having inner surfaces and a seal that define a closed chamber up to several millimeters in thickness therebetween, said chamber adapted to retain a quantity of fluid so that the fluid is in contact with both inner surfaces, and wherein at least one of said inner surfaces is functionalized with an array of RNA or DNA probes;
introducing a fluid sample containing DNA or RNA so as to provide a quantity of fluid in contact with both inner surfaces;
providing a bubble in the fluid using a discrete, controllable heat source;
moving a bubble within the fluid in the closed chamber to result in mixing;
after hybridization is complete, removing the sample from the apparatus; and
analyzing the functionalized inner surface for DNA or RNA that has hybridized.

14. A method according to claim 13, additionally comprising heating the DNA or RNA containing sample fluid while in the closed chamber.

15. A method according to claim 13, additionally comprising washing the functionalized inner surface prior to the analyzing.

16. A method according to claim 13, wherein the bubble is moved in a circular pattern.

* * * * *

UNITED STATES PATENT AND TRADEMARK OFFICE
CERTIFICATE OF CORRECTION

| | | |
|---|---|---|
| PATENT NO. | : 8,012,765 B2 | Page 1 of 1 |
| APPLICATION NO. | : 12/753777 | |
| DATED | : September 6, 2011 | |
| INVENTOR(S) | : Carol T. Schembri | |

It is certified that error appears in the above-identified patent and that said Letters Patent is hereby corrected as shown below:

On the title page, in item (56), under "Other Publications", in column 2, line 1, delete "Covection" and insert -- Convection --, therefor.

In column 10, line 11, in Claim 12, delete "of" and insert -- of claim --, therefor.

Signed and Sealed this
Third Day of January, 2012

David J. Kappos
*Director of the United States Patent and Trademark Office*